United States Patent
Kataoka et al.

(10) Patent No.: US 7,688,186 B2
(45) Date of Patent: *Mar. 30, 2010

(54) VEHICLE DERAILING PREVENTION DEVICE

(75) Inventors: Hiroaki Kataoka, Susono (JP); Seiji Kawakami, Susono (JP); Katsuhiko Iwazaki, Numazu (JP); Chumsamutr Rattapon, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 246 days.

This patent is subject to a terminal disclaimer.

(21) Appl. No.: 11/887,778

(22) PCT Filed: May 26, 2006

(86) PCT No.: PCT/JP2006/311033

§ 371 (c)(1),
(2), (4) Date: Oct. 3, 2007

(87) PCT Pub. No.: WO2006/126736

PCT Pub. Date: Nov. 30, 2006

(65) Prior Publication Data

US 2009/0009305 A1    Jan. 8, 2009

(30) Foreign Application Priority Data

May 27, 2005    (JP) .............................. 2005-156155

(51) Int. Cl.
B60Q 1/00    (2006.01)
(52) U.S. Cl. .................... 340/435; 340/436; 340/575; 340/576; 180/204; 701/45

(58) Field of Classification Search ................. 340/435, 340/436, 575, 576; 180/169, 204; 701/1, 701/41, 45
See application file for complete search history.

(56) References Cited

U.S. PATENT DOCUMENTS

| 5,765,116 A | * | 6/1998 | Wilson-Jones et al. | ........ 701/41 |
| 6,185,492 B1 | | 2/2001 | Kagawa et al. | |
| 6,212,453 B1 | * | 4/2001 | Kawagoe et al. | .............. 701/41 |

(Continued)

FOREIGN PATENT DOCUMENTS

DE    198 30 548 A1    2/1999

(Continued)

OTHER PUBLICATIONS

Katsuhiko Iwazaki et al., U.S. Appl. No. 11/134,301, filed May 23, 2005.

(Continued)

*Primary Examiner*—Davetta W Goins
(74) *Attorney, Agent, or Firm*—Oliff & Berridge, PLC

(57) ABSTRACT

A vehicle speed V is read (step S1), V is compared with a first threshold Vth1 (step S2), and, when V is not less than Vth1, a warning torque is set smaller with increase in V (step S3). When V is less than Vth1, V is further compared with a second threshold Vth2 (step S4), and when V is less than Vth2, the warning torque is set approximately in proportion to the vehicle speed (step S5); when V is not less than Vth2 and is less than Vth1, the warning torque is set at a predetermined constant value (step S6).

20 Claims, 15 Drawing Sheets

U.S. PATENT DOCUMENTS

| | | | |
|---|---|---|---|
| 6,422,335 B1 * | 7/2002 | Miller | 180/446 |
| 6,732,021 B2 * | 5/2004 | Matsumoto et al. | 701/1 |
| 7,034,698 B2 * | 4/2006 | Matsumoto et al. | 340/575 |
| 7,117,076 B2 * | 10/2006 | Shimakage et al. | 701/41 |
| 7,510,038 B2 * | 3/2009 | Kaufmann et al. | 180/169 |
| 2005/0004731 A1 | 1/2005 | Bohm et al. | |

FOREIGN PATENT DOCUMENTS

| | | |
|---|---|---|
| EP | 1 531 112 A1 | 5/2005 |
| JP | A-07-105498 | 4/1995 |
| JP | A-11-029061 | 2/1999 |
| JP | A-11-139335 | 5/1999 |
| JP | A-11-189166 | 7/1999 |
| JP | A-2000-062635 | 2/2000 |
| JP | A-2001-206237 | 7/2001 |
| JP | A-2002-154451 | 5/2002 |
| JP | A-2002-316601 | 10/2002 |
| JP | A-2002-362395 | 12/2002 |
| JP | A-2003-058993 | 2/2003 |
| JP | A-2003-081115 | 3/2003 |
| JP | A-2003-081123 | 3/2003 |
| JP | A-2004-243904 | 9/2004 |
| JP | A-2004-331026 | 11/2004 |
| JP | A-2005-125932 | 5/2005 |
| WO | WO 03/013940 A1 | 2/2003 |
| WO | WO 2006/126736 A1 | 11/2006 |

OTHER PUBLICATIONS

Katsuhiko Iwazaki et al., U.S. Appl. No. 11/134,318, filed May 23, 2005.
Seiji Kawakami et al., U.S. Appl. No. 11/136,450, May 25, 2005.
Seiji Kawakami et al., U.S. Appl. No. 11/135,287, May 24, 2005.
Hiroaki Kataoka et al., U.S. Appl. No. 11/138,307, May 27, 2005.
Satoru Niwa et al., U.S. Appl. No. 11/136,449, May 25, 2005.
Chumsamutr Rattapon et al. U.S. Appl. No. 11/138,432, May 27, 2005.

* cited by examiner

Fig.4
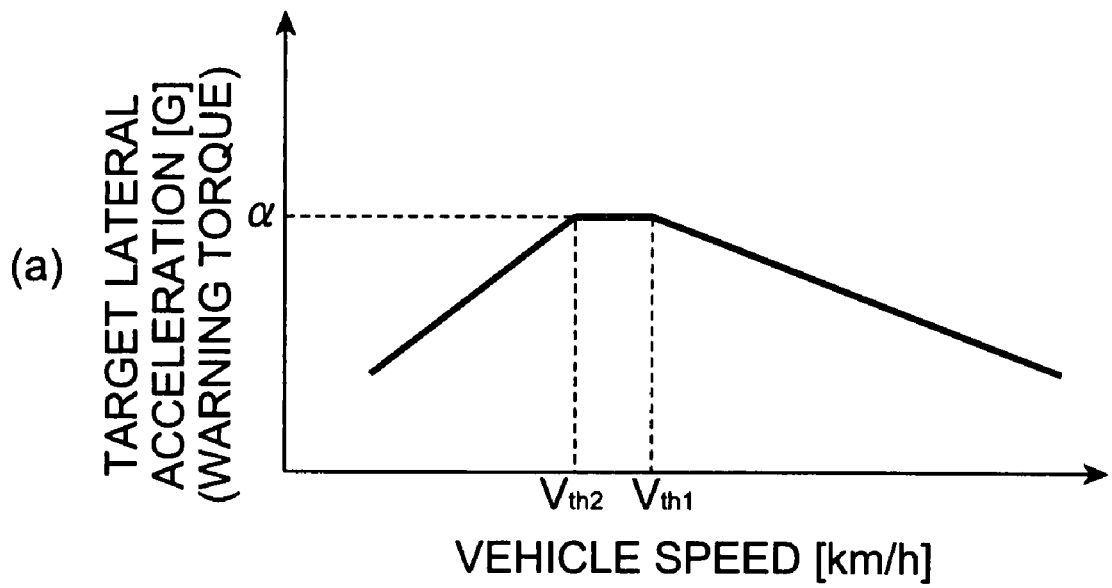
(a)
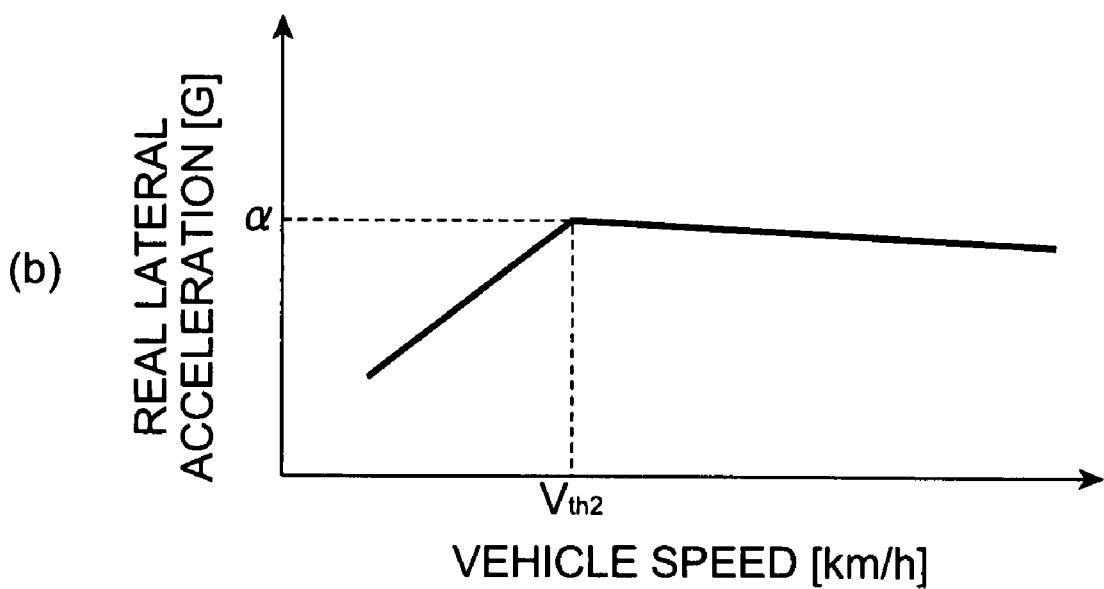
(b)

VEHICLE DERAILING PREVENTION DEVICE

TECHNICAL FIELD

The present invention relates to a vehicle deviation preventing apparatus arranged to detect a driving lane on which a host vehicle is driving, to estimate a path of the host vehicle, to determine whether the host vehicle will deviate from the driving lane, and, with a determination of a deviation, to issue a warning to a driver to prompt avoidance of the deviation.

BACKGROUND ART

There is a known technology of acquiring a road image in front of a vehicle with a camera mounted on the vehicle, detecting a driving lane on which the host vehicle is driving, by image processing, determining a possibility that the host vehicle will deviate from the driving lane, based on the detected driving lane information and an estimated path of the host vehicle, and, with a high possibility of a deviation, issuing a warning to a driver to prompt avoidance of the deviation by a steering operation or the like (e.g., cf. Japanese Patent Application Laid-Open No. 7-105498).

This technology is, for example, to determine a point of the deviation from the driving lane, based on an offset, a yaw angle, a curve radius, etc. of the driving lane and a yaw rate, a steering angle, a vehicle speed, etc. of the host vehicle, and to predict a state of the deviation on the basis of a distance between the foregoing point and the host vehicle and an angle between the estimated path at the point and a lane line of the driving lane. When it is determined that the vehicle can deviate, a warning is issued to the driver, or a correction steering operation is carried out.

DISCLOSURE OF THE INVENTION

Incidentally, a known means for notifying the driver of the possibility of deviation upon the prediction of lane deviation as described above is a means for notifying the driver by applying a torque to a steering system. However, if the torque applied to the steering system upon the issue of the warning (which will be referred to hereinafter as a warning torque) is kept constant, independent of driving conditions and ambient conditions of the vehicle, there will be cases where the warning torque is too weak to fully exercise the warning effect to the driver and where, conversely, the warning torque is so strong as to cause the driver to feel uncomfortable.

An object of the present invention is therefore to provide a vehicle deviation preventing apparatus enabling provision of a warning torque of an appropriate strength according to a driving condition or an ambient condition of a vehicle.

In order to achieve the above object, a vehicle deviation preventing apparatus according to the present invention is (1) a vehicle deviation preventing apparatus comprising: deviation determining means for detecting a driving lane on which a host vehicle is driving, and for determining whether the host vehicle will deviate from the driving lane, based on a positional relation between the driving lane and the host vehicle; and warning means for applying to a steering wheel a torque for issuing a warning to a driver, with a determination of a deviation; the vehicle deviation preventing apparatus having vehicle speed detecting means for detecting a vehicle speed, wherein the warning means sets the torque for issuing the warning to the driver, smaller when the detected vehicle speed is high than when the detected vehicle speed is low. The apparatus may be characterized in that the warning means sets the torque for issuing the warning to the driver, smaller when the detected vehicle speed is larger than a predetermined vehicle speed, than the torque applied at the predetermined vehicle speed.

In a high vehicle speed region, a damping property of yaw motion of the vehicle becomes deteriorated as described later, to increase an overshoot amount of lateral acceleration of the vehicle. This leads to increase in the vehicle behavior even with the same applied warning torque and makes the driver more likely to feel that "the warning torque is too strong." Since the applied warning torque is set smaller when the vehicle speed is high, the increase in the vehicle behavior is restrained.

Since the damping property becomes more deteriorated with increase in the vehicle speed, this warning means is preferably arranged to decrease the applied torque with increase in the vehicle speed when the vehicle speed is not less than the predetermined vehicle speed.

Since the vehicle behavior occurring upon application of the warning torque is caused according to a yaw motion property of the vehicle, the torque applied by the warning means is preferably set based on the yaw motion property of the vehicle.

Furthermore, an overshoot amount of real lateral acceleration on the vehicle body increases with increase in a time change rate of the warning torque. Therefore, the torque applied by the warning means is preferably set smaller with increase in the time change rate of the torque.

Another vehicle deviation preventing apparatus according to the present invention is the vehicle deviation preventing apparatus of (1), which has driving environment grasping means for grasping a road driving environment, wherein the warning means sets the torque for issuing the warning to the driver, based on the grasped road driving environment.

Even if vehicle conditions are equal, the effect of the warning torque on the driver varies depending upon road driving environments. Therefore, the warning torque is varied according to the grasped driving environment whereby a driver's uncomfortable feeling is alleviated upon application of the warning torque.

Since an opposing vehicle or a parallel running vehicle is closer on a narrow road than on a wide road, the driver becomes more likely to feel that the warning torque is too strong even if the same warning torque is applied. Therefore, the road driving environment grasped by this driving environment grasping means is preferably information about a lane width and the applied torque is preferably set smaller when the lane width is small than when it is large.

If the road surface itself has a slope, the effect on the vehicle behavior in an upward direction will be different from that in a downward direction even if the same warning torque is applied. Therefore, the road driving environment grasped by the driving environment grasping means is preferably inclination information of the road surface in a direction intersecting a driving direction, and the warning means preferably sets the applied torque smaller when the deviation direction is the upward direction of inclination of the road surface than when the deviation direction is the downward direction.

Still another vehicle deviation preventing apparatus according to the present invention is the vehicle deviation preventing apparatus of (1), which has obstacle grasping means for grasping obstacle information around the vehicle, wherein the warning means sets the torque for issuing the warning to the driver, based on the grasped obstacle information.

When there is an obstacle such as a parked car or an electric pole (including a motorcycle, a bicycle, and a pedestrian as well as the opposing vehicle and the parallel running vehicle) around the vehicle, the driver becomes more likely to feel that the warning torque is too strong than when there is no obstacle, even if the same warning torque is applied. Therefore, the warning torque is set in consideration of the obstacle to alleviate the uncomfortable feeling.

The warning torque is applied in a direction opposite to the deviation direction. Therefore, the warning torque applied when the vehicle is about to deviate from the lane in the direction away from the obstacle moves the vehicle toward the obstacle; whereas the warning torque applied when the vehicle is about to deviate from the lane in the direction toward the obstacle moves the vehicle away from the obstacle. In the former case, the application of the warning torque can make the driver feel more dangerous than in the latter case. Therefore, the warning means is preferably arranged to set the applied torque smaller when the deviation direction is the direction away from the grasped obstacle than when it is the direction toward the obstacle.

A vehicle deviation preventing apparatus according to the present invention may be the vehicle deviation preventing apparatus of (1), wherein the warning means sets the torque for issuing the warning to the driver, according to a braking force or a driving force generated on a steered wheel.

Since the self-aligning torque is lower with the braking force or the driving force acting on the steered wheel than without them, the steering resistance and resulting lateral acceleration of the vehicle will decrease. Therefore, the torque is set in consideration of this decrease.

When the steered wheel is a driving wheel, the warning means is preferably arranged to set the applied torque on the basis of control information of a driving source. The reason is that the driving force applied to the steered wheel when the steered wheel is the driving wheel can be determined from the control information of the driving source (an accelerator stroke or the like).

The warning means may also be arranged to set the applied torque on the basis of control information of a braking system. The reason is that the braking force acting on the steered wheel can be determined from the control information of the braking system (brake pedal force, hydraulic pressure of a wheel cylinder, or the like).

When the steered wheel is a driving wheel, the apparatus may further comprise means for detecting a road slope and the warning means may be arranged to set the applied torque according to the detected road slope. A driving force is normally applied on a climbing lane, while a braking force (including an engine brake) is normally applied on a declining lane. Therefore, the torque is applied according to the road slope, whereby the torque is applied according to the braking/driving force.

The setting of the torque by these warning means is preferably at least either setting of a peak value of the applied torque or setting of a time change rate in a rise. A minimum value is preferably set for the peak value and the time change rate of the torque.

BRIEF DESCRIPTION OF THE DRAWINGS

FIG. 4 is graphs showing a setting example of the warning torque in the control embodiment of FIG. 3, and real lateral acceleration achieved thereby.

BEST MODE FOR CARRYING OUT THE INVENTION

The preferred embodiments of the present invention will be described below in detail with reference to the accompanying drawings. For easier understanding of description, identical components will be denoted by the same reference symbols throughout the drawings as much as possible, without redundant description.

Figure 1:
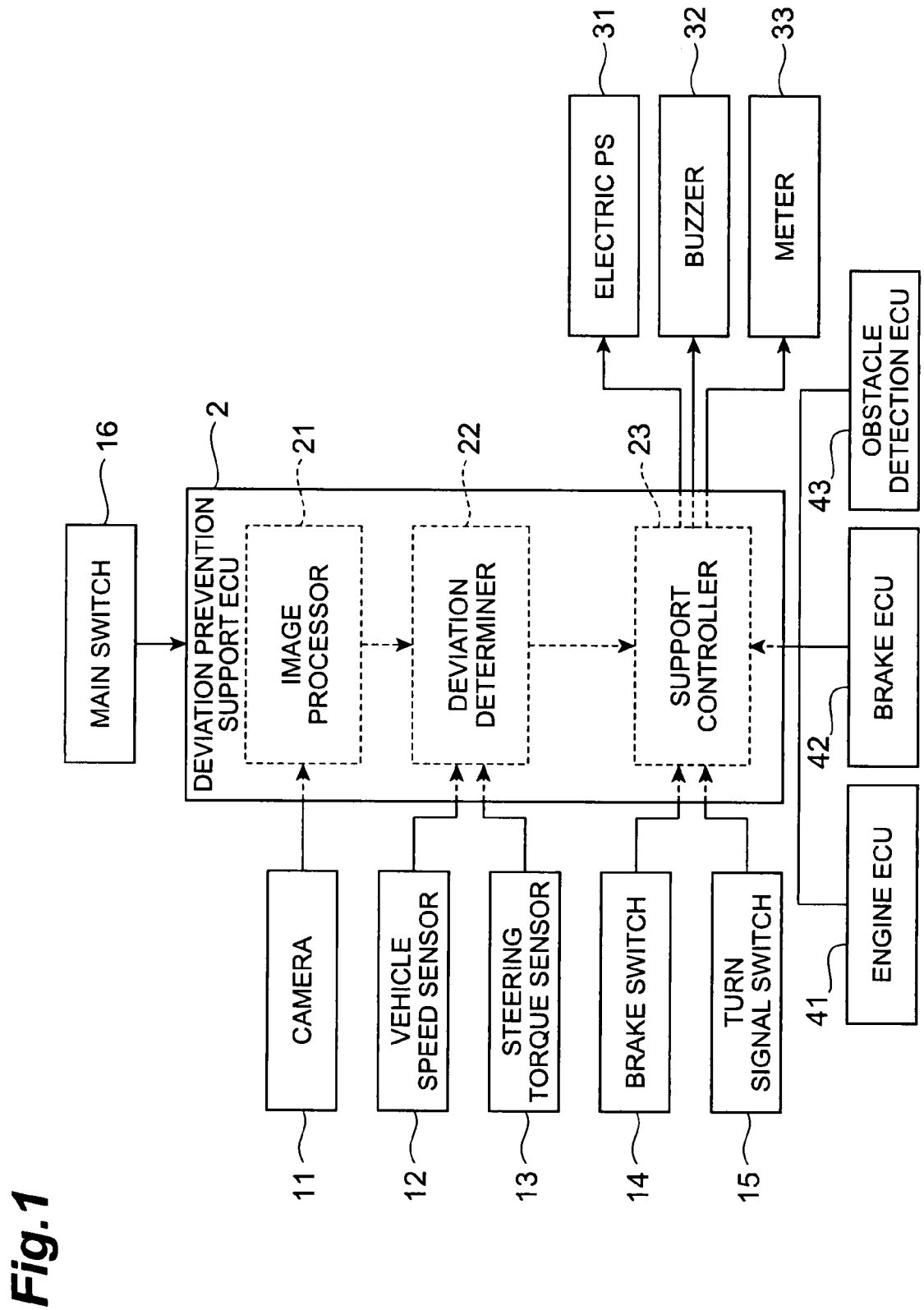
FIG. 1 is a block diagram of a vehicle deviation prevention control apparatus according to the present invention.
Figure 2:
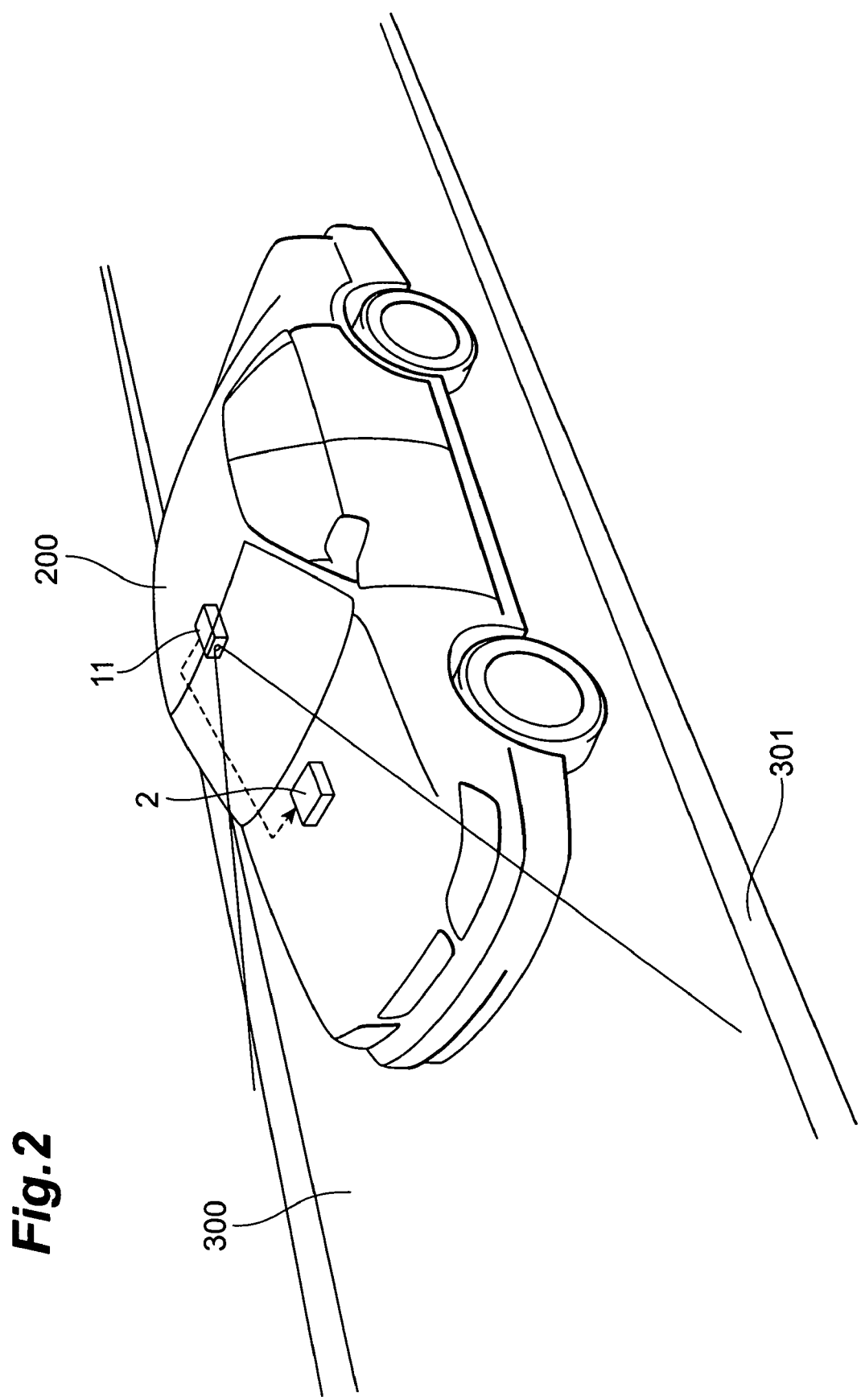
FIG. 2 is a perspective view showing a vehicle equipped with the control apparatus of FIG. 1.

FIG. 1 is a block diagram of a vehicle deviation prevention control apparatus according to the present invention and FIG. 2 a perspective view showing a vehicle equipped with the control apparatus. This vehicle deviation prevention control apparatus (which will be referred to hereinafter simply as the control apparatus) 100 is composed mainly of a deviation prevention support ECU 2. This deviation prevention support ECU 2 is comprised of a combination of a CPU, a ROM, a RAM, other memory devices, etc., and is provided with an image processing part 21, a deviation determining part 22, and a support controlling part 23. Each of the parts 21-23 may be sectionalized on a hardware basis, or they may be sectionalized on a software basis while sharing hardware in part or in whole, or they may be comprised of a plurality of software applications sharing part of each, or they may be parts of one software application.

The image processing part 21 performs image processing to recognize road lane lines (which can be white lines or yellow lines drawn on roads, blocks placed on or buried in roads, or the like and which will be referred to hereinafter simply as white lines) defining the both edges of a driving lane on which the host vehicle is driving, from image information acquired by a camera 11 for acquiring an image in front of the vehicle, thereby recognizing the driving lane, and outputs the recognized driving lane information (curve R, offset, yaw angle, and the like).

The deviation determining part 22 estimates a predicted arrival position of the host vehicle after a predetermined time from vehicle speed information acquired by a vehicle speed sensor 12 (e.g., wheel speed sensors located at the respective wheels) and steering torque information acquired by a steering torque sensor 13 (which is located on a steering shaft and which detects a steering torque exerted by a driver), and determines a possibility of deviation of the vehicle from the driving lane, based on the predicted arrival position and the driving lane information recognized by the image processing part 21.

The support controlling part 23 is a control part that performs a deviation prevention support, based on the result of the determination by the deviation determining part 22, and in the present embodiment the support controlling part 23 issues a warning to the driver, as a deviation prevention support. An electric power steering system (PS) 31, a buzzer 32, and a meter 33 are connected as warning means to the support controlling part 23. The support controlling part 23 also receives output signals from a brake switch 14 and from a turn signal switch 15. The support controlling part 23 also has a function of communicating with an engine ECU 41, a brake ECU 42, and an obstacle detection ECU 43 through an in-vehicle LAN.

The engine ECU 41 feeds information about setting of driving force (e.g., an accelerator stroke) and the brake ECU 42 feeds information about setting of braking force (e.g., a brake pedal force or a hydraulic pressure of a wheel cylinder of the steered wheels). The obstacle detection ECU 43 feeds information about a position and type of an obstacle detected by means of an unrepresented obstacle sensor (which embraces a sensor for directly detecting an obstacle like a sonar or a radar, and which also embraces a system for detecting an obstacle by a combination of a camera with an image processing unit).

An output signal from a main switch 16 is fed to the deviation prevention support ECU 2 to permit the driver to switch permission/prohibition of execution of the deviation prevention support.

The camera 11 is located in the upper part of the front windshield of vehicle 200 (e.g., on the back side of a rearview mirror) as shown in FIG. 2, and acquires an image of a driving lane 300 ahead the vehicle (including white lines 301). The camera 11 may be located anywhere (e.g., in the front part of the vehicle body) on the vehicle body as long as it can capture the image ahead the vehicle.

First, the basic operation of the control apparatus 100 of the present invention will be described in a situation in which the main switch 16 is set on.

The camera 11 first acquires a moving picture ahead the vehicle, for example, at the TV frame rate and outputs the moving picture to the image processing part 21. The image processing part 21 performs image recognition processing using a known image processing technique such as edge detection, to recognize positions of the white lines 301 at the two edges of the driving lane 300, and outputs predetermined white line recognition information.

The deviation determining part 22 obtains a predicted arrival position a certain deviation prediction time (TLC: Time to lane crossing) later on the basis of the vehicle information acquired by the vehicle speed sensor 12 and the steering torque sensor 13, determines whether the vehicle will be located within the driving lane 300 at the time TLC (i.e., whether the vehicle will deviate from the driving lane), based on the predicted arrival position and the white line recognition information acquired from the image processing part 21, and, when it determines that the vehicle will deviate from the driving lane 300, it outputs the determination of the deviation possibility to the support controlling part 23.

When the support controlling part 23 receives the information indicating the deviation possibility, from the deviation determining part 22, it activates the buzzer 32, displays the information at a pertinent location in the meter 33, and actuates an electric motor of the electric PS 31 to exert a predetermined warning torque on the steering wheel, thereby notifying the driver of a risk of the deviation. When the driver is in a braking operation (i.e., when the brake switch 14 is on), or when the driver manipulates a direction indicator for change of lane or for preparation for a right or left turn or the like (i.e., when the turn signal switch 15 is on), the support controlling part determines that there is no need for notifying the driver of the risk of deviation, and performs none of the various warnings.

Figure 3:
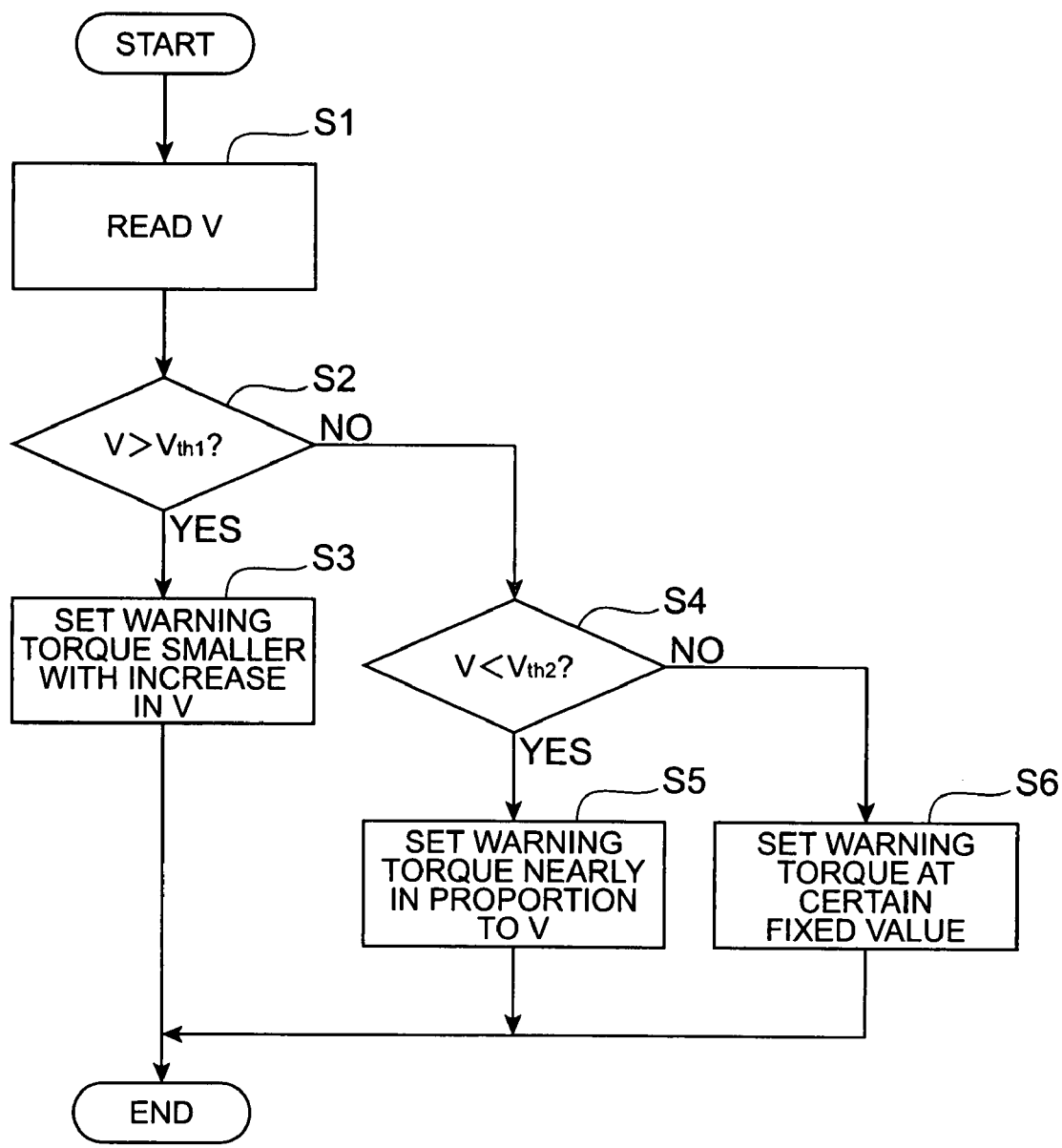
FIG. 3 is a flowchart showing a first embodiment of setting processing of the warning torque in the control apparatus of FIG. 1.

How to set the applied warning torque will be described below with specific examples. FIG. 3 is a flowchart showing the first embodiment of the setting processing of the warning torque. The first step is to read a vehicle speed V from the output of vehicle speed sensor 12 (step S1). The next step is to determine whether the vehicle speed V is not less than a first threshold Vth (step S2). When the vehicle speed V is not less than the first threshold Vth1, the flow moves to step S3 to set the warning torque smaller with increase in the vehicle speed V, and then the processing is terminated. On the other hand, when the vehicle speed V is less than the first threshold Vth1, it is further determined whether the vehicle speed V is less than a second threshold Vth2 (step S4). This second threshold Vth2 is set to be smaller than the first threshold Vth1. When the vehicle speed V is less than the second threshold Vth2, the flow moves to step S5 to set the warning torque approximately in proportion to the vehicle speed V and then the processing is terminated. On the other hand, when the vehicle speed V is not less than the second threshold Vth2 (more specifically, when V is not less than Vth2 and is less than Vth1), the warning torque is set at a predetermined constant value (step S6).

Figure 5:
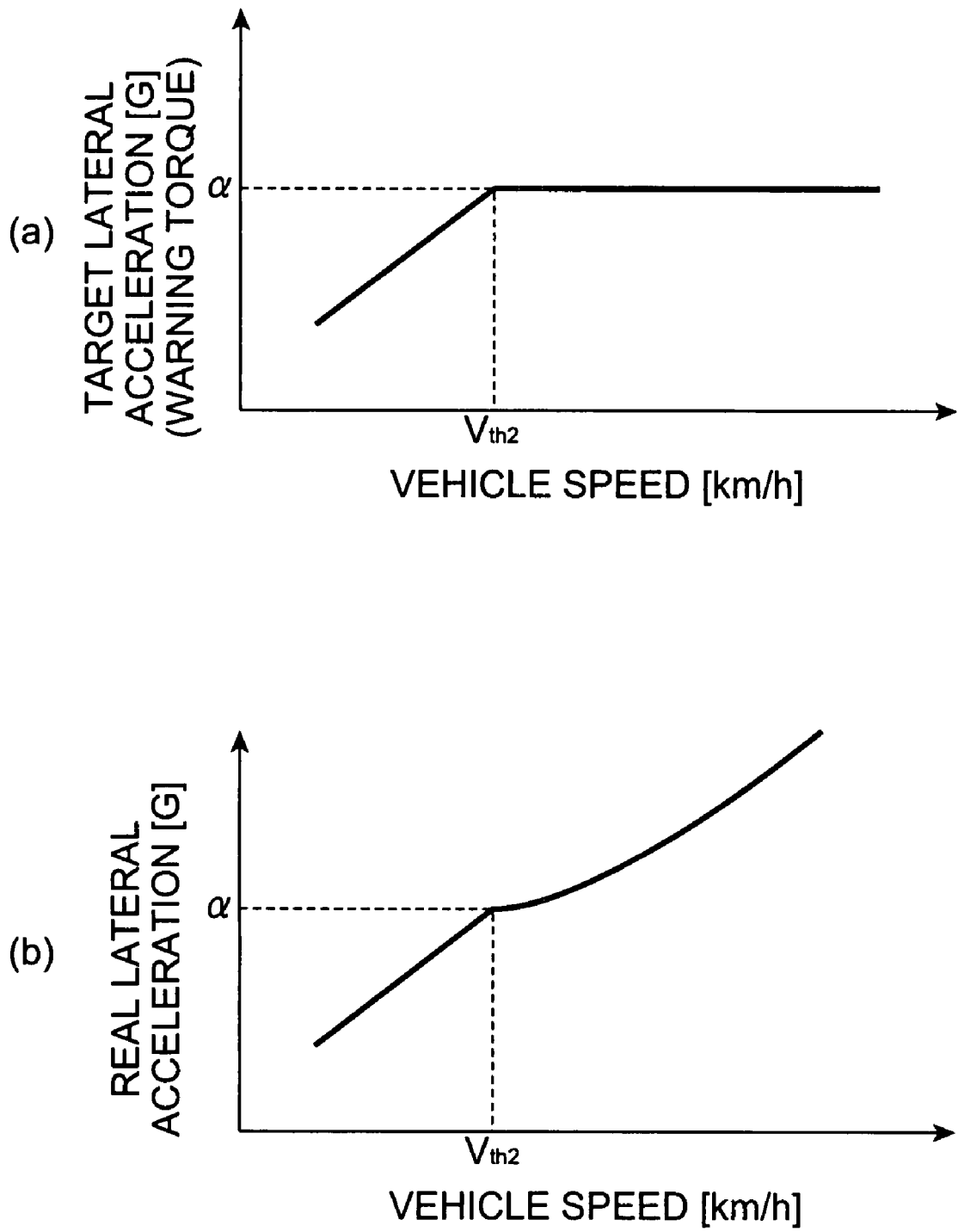
FIG. 5 is graphs showing the warning torque set by conventional control and real lateral acceleration achieved thereby.

FIG. 4 is graphs showing a setting example of the warning torque according to this control embodiment (FIG. 4 (a)), and real lateral acceleration achieved thereby (FIG. 4 (b)), and FIG. 5 is graphs showing the warning torque set by the conventional control (FIG. 5 (a)) and real lateral acceleration achieved thereby (FIG. 5 (b)).

Figure 6:
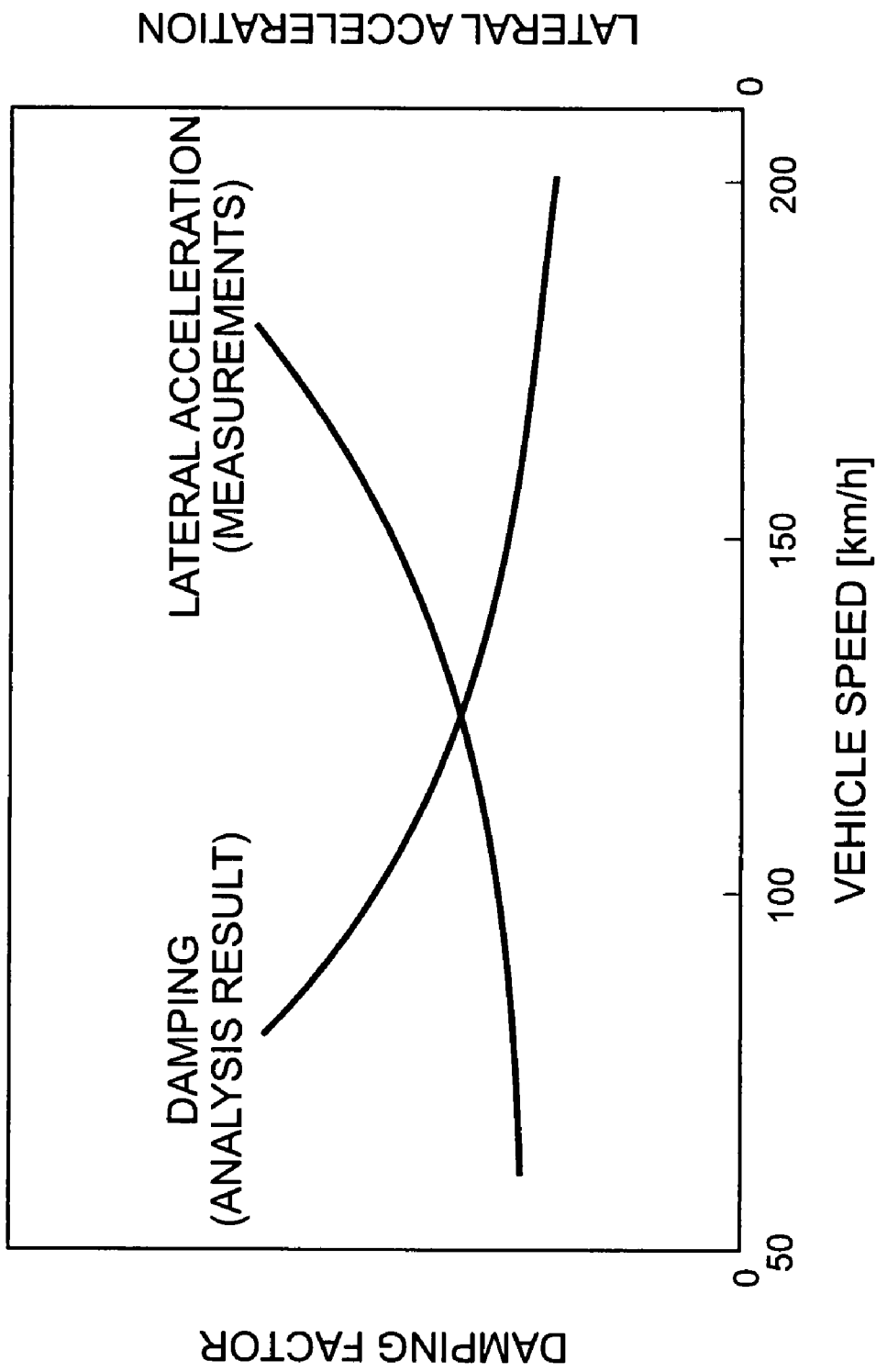
FIG. 6 is a graph showing vehicle speed-damping characteristics and lateral acceleration with application of an identical steering torque.
Figure 7:
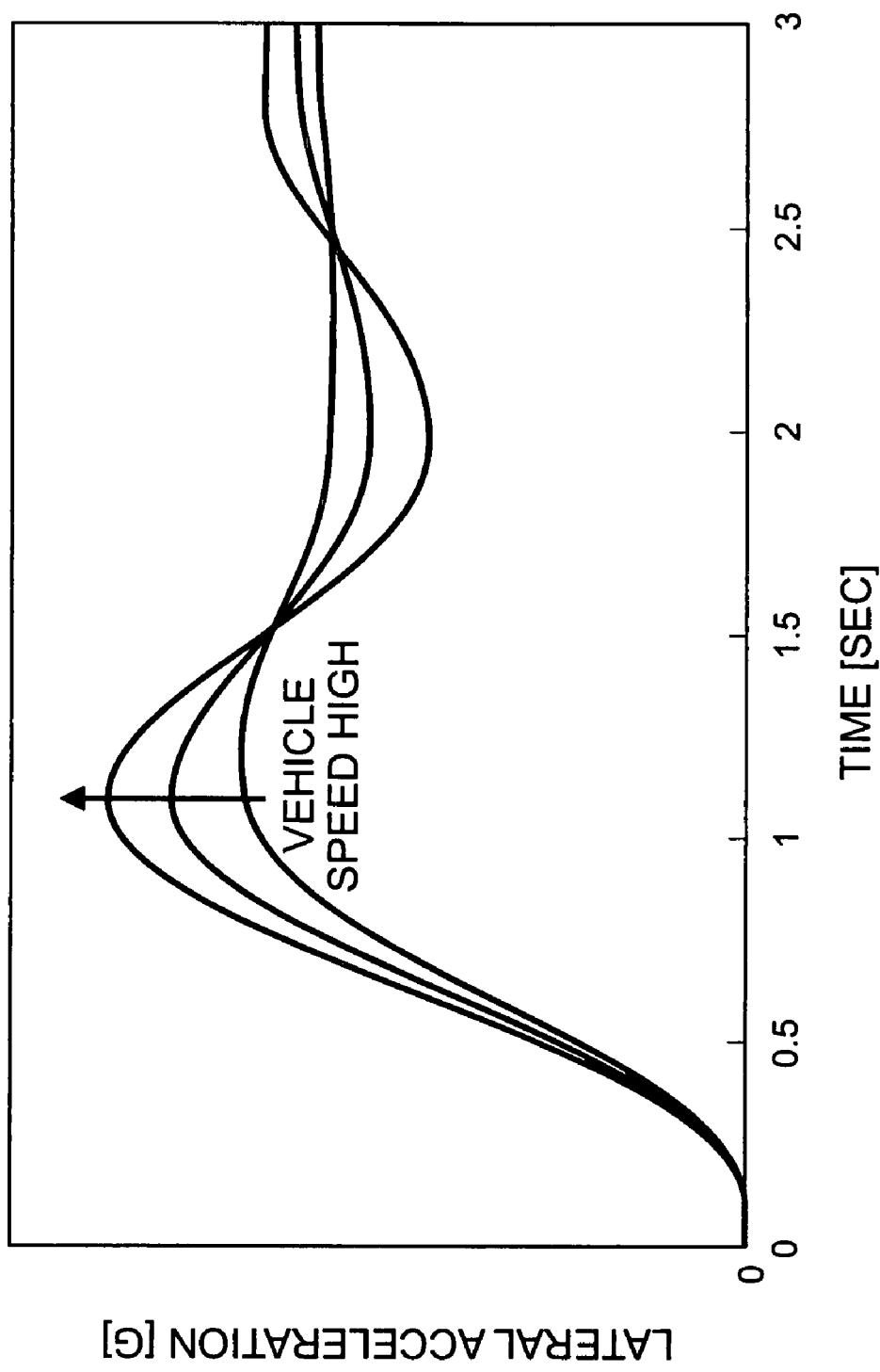
FIG. 7 is a graph showing temporal changes of lateral acceleration of a vehicle at different vehicle speeds.

The conventional control results in generating large lateral accelerations in practice in a high speed region, as shown in FIG. 5 (b). This is because a damping property of yaw motion of the vehicle (lateral acceleration of vehicle with steering torque) becomes deteriorated even if the same steering torque is applied, as shown in FIG. 6. Furthermore, an overshoot amount of lateral acceleration increases at high vehicle speeds, as shown in FIG. 7, and therefore the vehicle behavior becomes greater. In such a state, the driver is likely to feel that the warning torque is too strong.

In the present control embodiment, as shown in FIG. 4 (a), the warning torque in the low speed region (below Vth2) is so set that the yaw rate becomes approximately constant, and the warning torque in the high speed region (not less than Vth2) is so set that the real lateral acceleration becomes approximately constant (cf. FIG. 4 (b)). This can restrain an extreme variation of the vehicle behavior in the high speed region, so as to alleviate the driver's uncomfortable feeling with the warning torque and improve drivability.

Furthermore, when the time change rate of torque is variable during application of the warning torque, the peak value of the warning torque at high speed is preferably set smaller with increase in the time change rate in a rise. Even if the peak value is equal, the overshoot amount of real lateral acceleration will increase with increase in the time change rate in a rise, to make its influence greater on the vehicle behavior. On the other hand, the larger the time change rate in a rise, the easier the driver can recognize the application of the warning torque (which will be referred to hereinafter as a sensation of the warning torque). Therefore, the peak value is set smaller with increase in the time change rate in a rise, whereby the effect of restraining the overshoot amount can be achieved while ensuring the sensation of the warning torque.

The warning torque was so set that the real lateral acceleration in the high speed region became approximately constant in FIG. 4, but the warning torque may also be set so that the real lateral acceleration becomes smaller with increase in the vehicle speed, in the high vehicle speed region. In general the driver tenses up more and more with increase in the vehicle speed. For this reason, the driver becomes more likely to feel that the warning torque is too strong even if the vehicle behavior and the sensation of the warning torque are constant. When the warning torque is applied so that the real lateral acceleration becomes smaller with increase in the vehicle speed, the warning torque of an appropriate strength is applied while preventing the sensuous strength of the warning torque from becoming too large in the high speed region.

Figure 8:
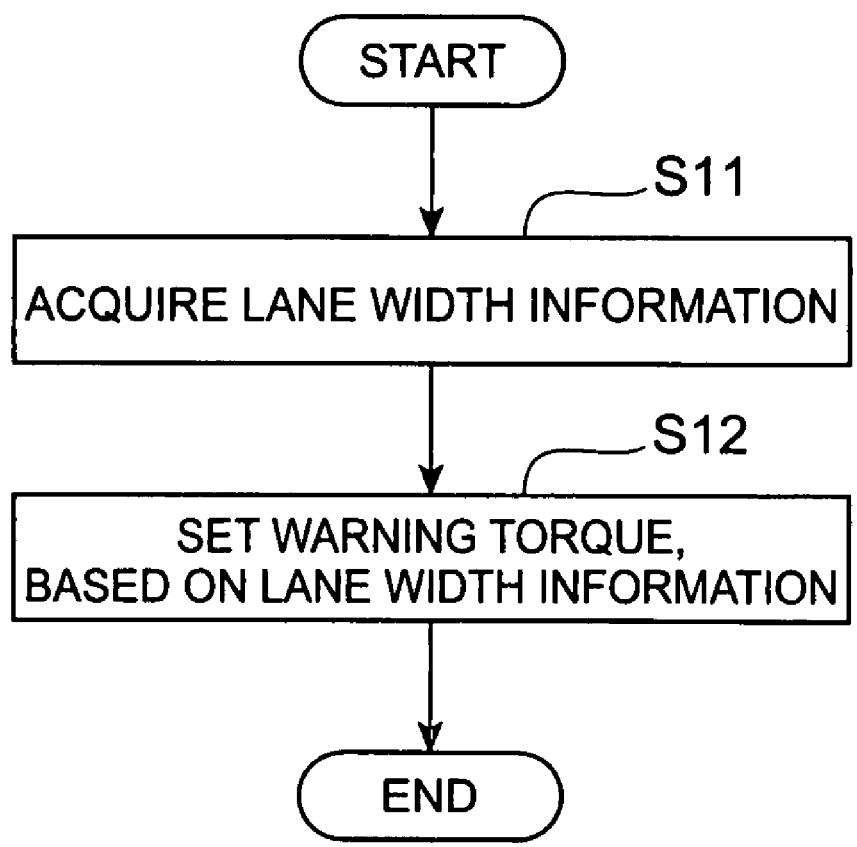
FIG. 8 is a flowchart showing a second embodiment of setting processing of the warning torque in the control apparatus of FIG. 1.

Next, the second control embodiment will be described. FIG. 8 is a flowchart showing the second embodiment of setting processing of the warning torque. The first step is to acquire lane width information of a driving lane on which the host vehicle is driving (step S11). This lane width information can be calculated, for example, from the white line recognition information acquired in the image processing part 21. At this time, in order to restrain influence of noise or the like of the recognition processing, it is preferable to use an average over a predetermined period of time (e.g., one second), or to perform a mask process of determining a change of lane width when the lane width continuously remains in a certain range, for example.

Figure 9:
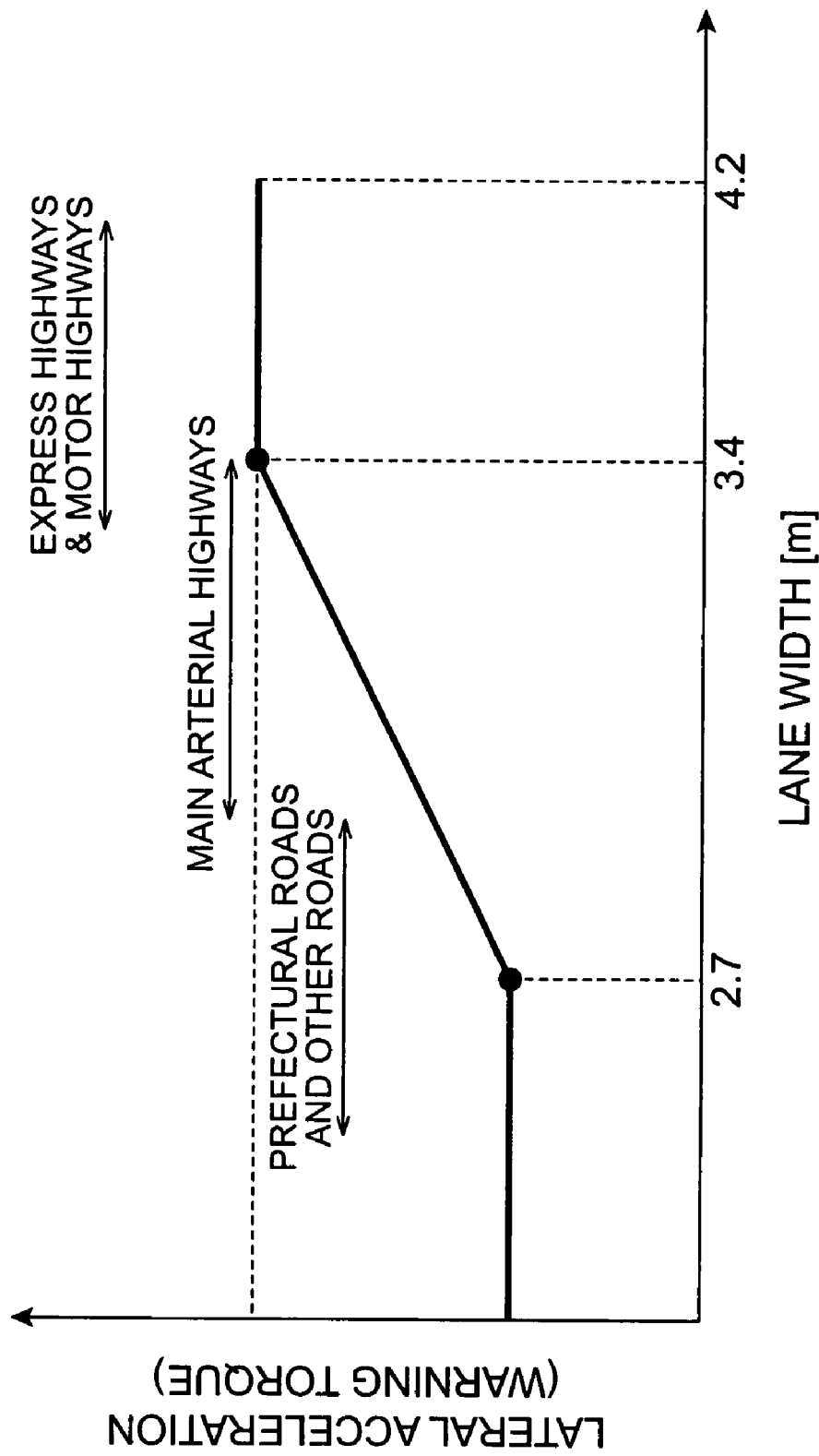
FIG. 9 is a graph showing a setting example of the warning torque according to a lane width.

The next step is to set the warning torque on the basis of the lane width (step S12), and the processing is then terminated. FIG. 9 is a graph showing a setting example of the warning torque according to the lane width. The host vehicle is located closer to a parallel driving vehicle or an opposing vehicle driving on another driving lane or closer to an obstacle (pedestrian, bicycle, parked vehicle on the road, electric pole, or the like) on a narrow road than on a wide road. For this reason, a marginal distance tends to be short to these obstacles, and the driver becomes more likely to sensuously feel that the warning torque is too strong. Therefore, the warning torque is applied in a relatively small magnitude on a narrow road, while the warning torque is applied in a relatively large magnitude on a wide road, whereby the warning torque is prevented from becoming sensuously too large.

The above described the example in which the lane width information of the driving lane on which the host vehicle is driving was acquired by the image processing from the image acquired with the camera 11, but the lane width information may be acquired from a navigation system. It is also possible to acquire the lane width information by road-vehicle communication or the like. The lane width information stated herein is assumed to contain a type of a road, in addition to the lane width itself. The lane width is wide for motor highways such as express highways, the lane width is narrower for main arterial highways which are not the motor highways, and the lane width is much narrower for prefectural roads and municipal roads than it (cf. FIG. 9). Therefore, much the same effect can be achieved when the lane width is determined on the basis of the type of the road. In this case, for example, the warning torque is set relatively large for motor highways, and the warning torque is set small for the other roads. This switching does not always have to be two stages, but may be stepwise switching in several stages according to types of roads.

Figure 10:
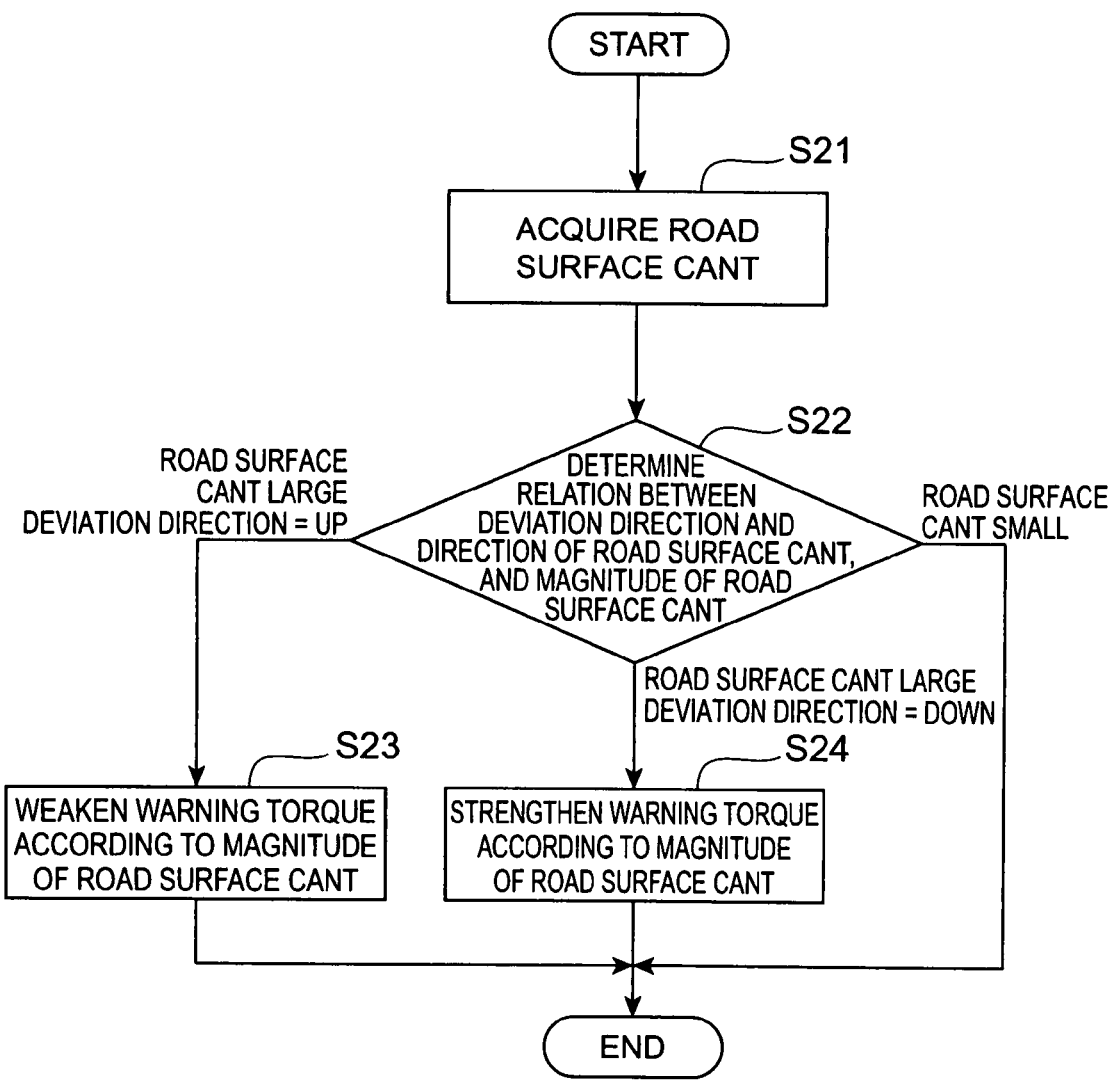
FIG. 10 is a flowchart showing a third embodiment of setting processing of the warning torque in the control apparatus of FIG. 1.

Next, the third control embodiment will be described. FIG. 10 is a flowchart showing the third embodiment of setting processing of the warning torque. It is assumed herein that the warning torque as a standard is already set by the technique of the first embodiment or the second embodiment.

The first step is to acquire a road surface cant of a driving lane on which the host vehicle is running (which is an inclination of a road surface in a direction perpendicular to an extending direction of the road) (step S21). This road surface cant can be calculated, for example, from the white line recognition information acquired in the image processing part 21. Alternatively, the road surface cant can also be acquired from a lateral acceleration sensor mounted on the vehicle 200. At this time, the mask process is preferably carried out as it was the case in the second embodiment.

The next step is to determine a relation between a lane deviation direction and a direction of the road surface cant and the magnitude of the road surface cant (step S22). When the lane deviation direction agrees with an upward direction of the road surface cant and when the magnitude of the road surface cant is not less than a predetermined value, the flow moves to step S23 to weaken the warning torque according to the magnitude of the road surface cant. In this case, a component force along the road surface direction of the gravitational acceleration acting on the vehicle is acting in a direction to avoid a lane deviation. For this reason, the driver feels the resulting real lateral acceleration increasing even if the warning torque is constant, and therefore the warning torque is weakened in consideration of this influence of the gravitational acceleration to restrain the driver's uncomfortable feeling.

Conversely, when the lane deviation direction agrees with a downward direction of the road surface cant and when the magnitude of the road surface cant is not less than a predetermined value (which may be different from the predetermined value in the upward direction), the flow moves to step S24 to strengthen the warning torque according to the magnitude of the road surface cant. In this case, the component force along the road surface direction of the gravitational acceleration acting on the vehicle is acting in a direction to promote the lane deviation. For this reason, the driver feels the resulting real lateral acceleration decreasing even if the warning torque is constant, and therefore the warning torque is strengthened in consideration of this influence of the gravitational acceleration to restrain the driver's uncomfortable feeling and ensure a deviation margin time to call driver's attention.

When the inclination of the road surface cant is small (when the conditions for movement to the steps S23, S24 are not met), the processing is directly terminated. In this case, the warning torque is maintained at the standard value.

Figure 11:
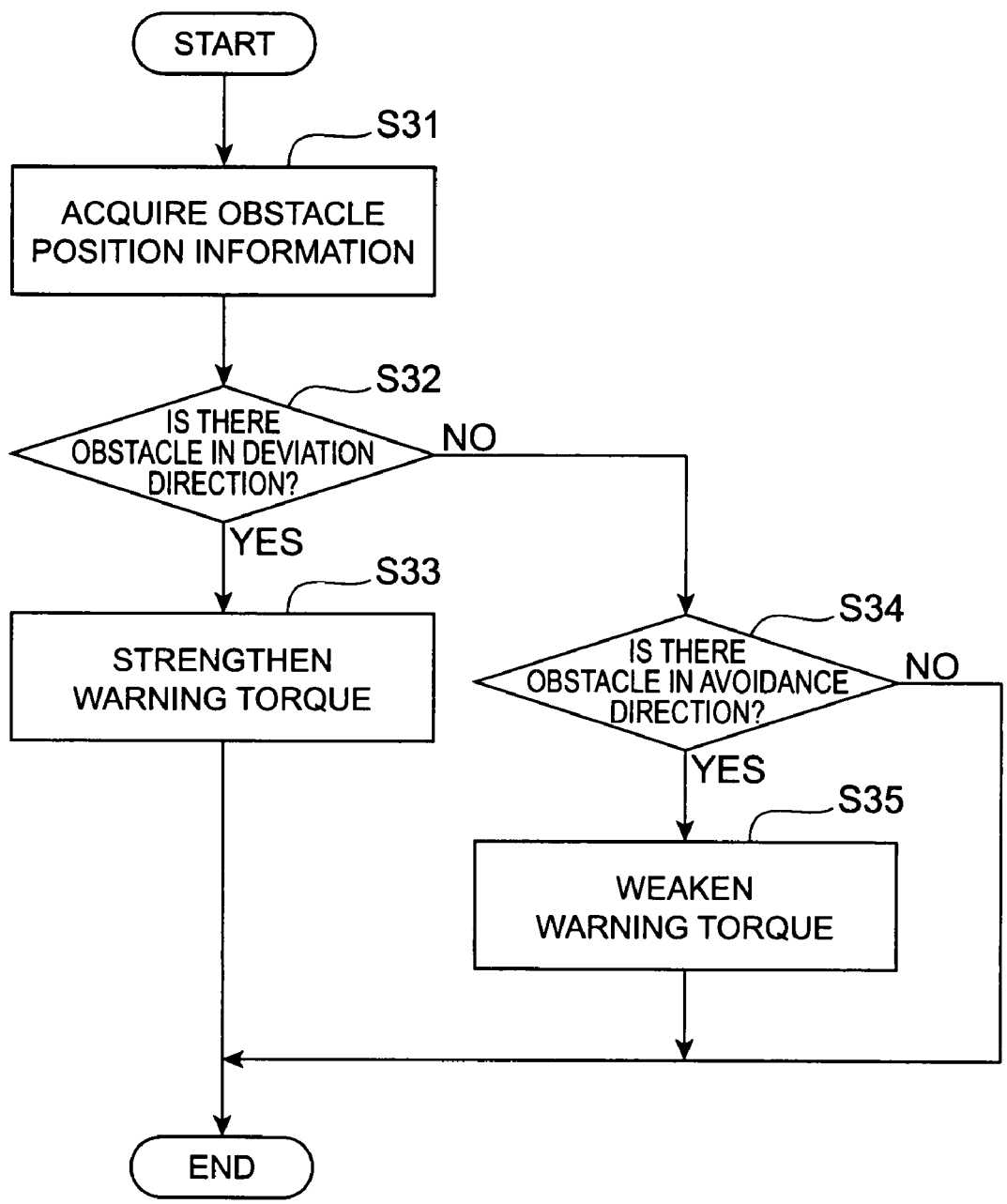
FIG. 11 is a flowchart showing a fourth embodiment of setting processing of the warning torque in the control apparatus of FIG. 1.

Next, the fourth control embodiment will be described. FIG. 11 is a flowchart showing the fourth embodiment of setting processing of the warning torque. It is also assumed herein that the warning torque as a standard is already set by the technique of the first embodiment or the second embodiment.

Figure 12:
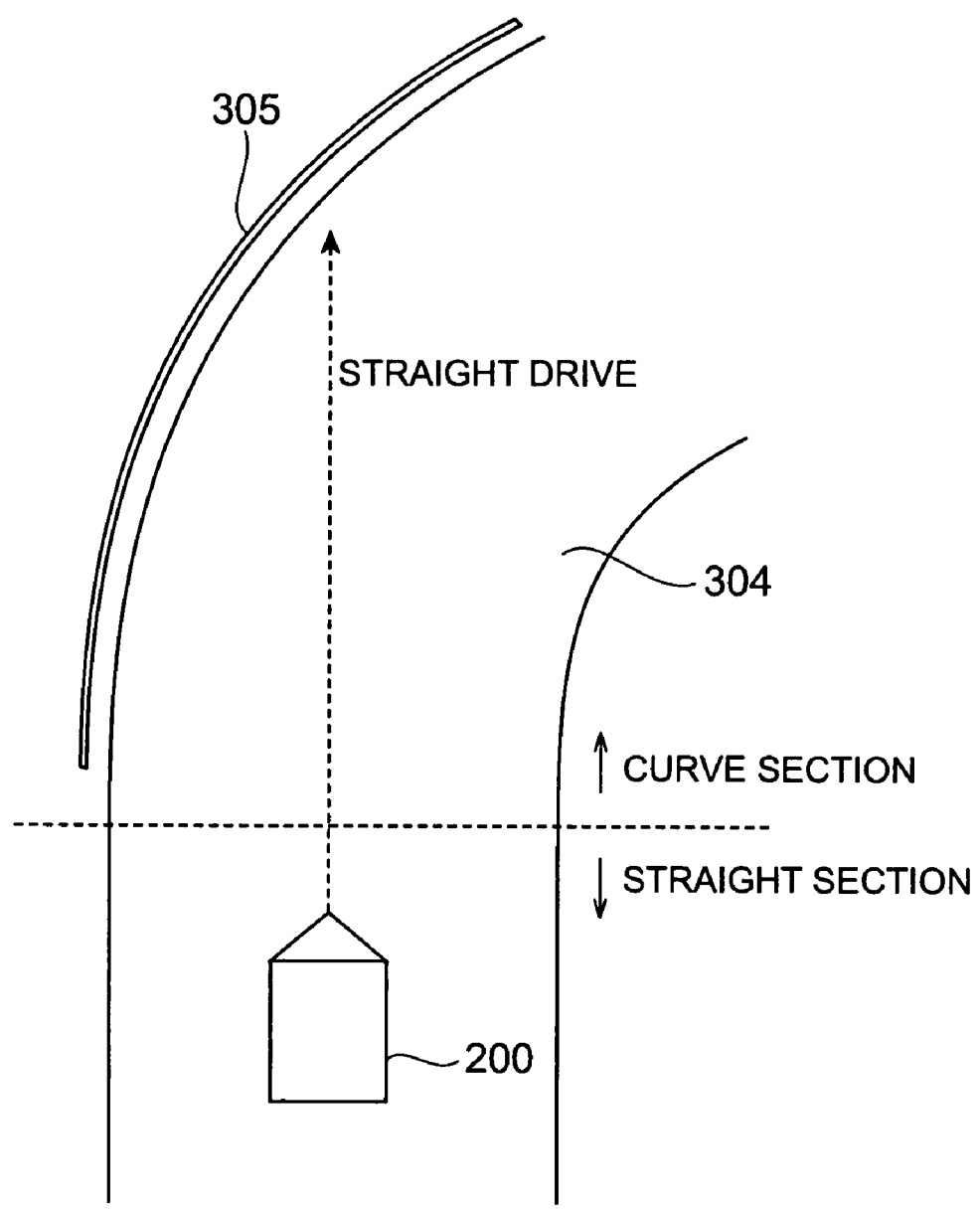
FIG. 12 is a drawing showing an example in which an obstacle exists in a lane deviation direction.

The first step is to acquire position information of an obstacle around the vehicle from the obstacle detection ECU 43 (step S31). First, it is determined whether an obstacle exists in a lane deviation direction (step S32). When an obstacle exists in the deviation direction, for example, in a case where the host vehicle is driving on a curved road 304 with guardrail 305 present outside the road as shown in FIG. 12 and can deviate outward from the curve, the flow moves to step S33 to strengthen the warning torque from the warning torque as the standard. When an obstacle exists in the deviation direction, as shown in FIG. 12, the driver generally tends to feel the warning torque smaller than in the case without any obstacle, because of a sense of fear for approach to the obstacle. Even if the warning torque is applied, there is a risk of delay of recognition as a warning because of a sense of expectancy that the vehicle can avoid the obstacle with no need for the driver himself to carry out any avoidance operation. Therefore, the warning torque is strengthened in comparison with the case without any obstacle, to make the driver recognize the possibility of deviation earlier and to prompt the avoidance operation.

Figure 13:
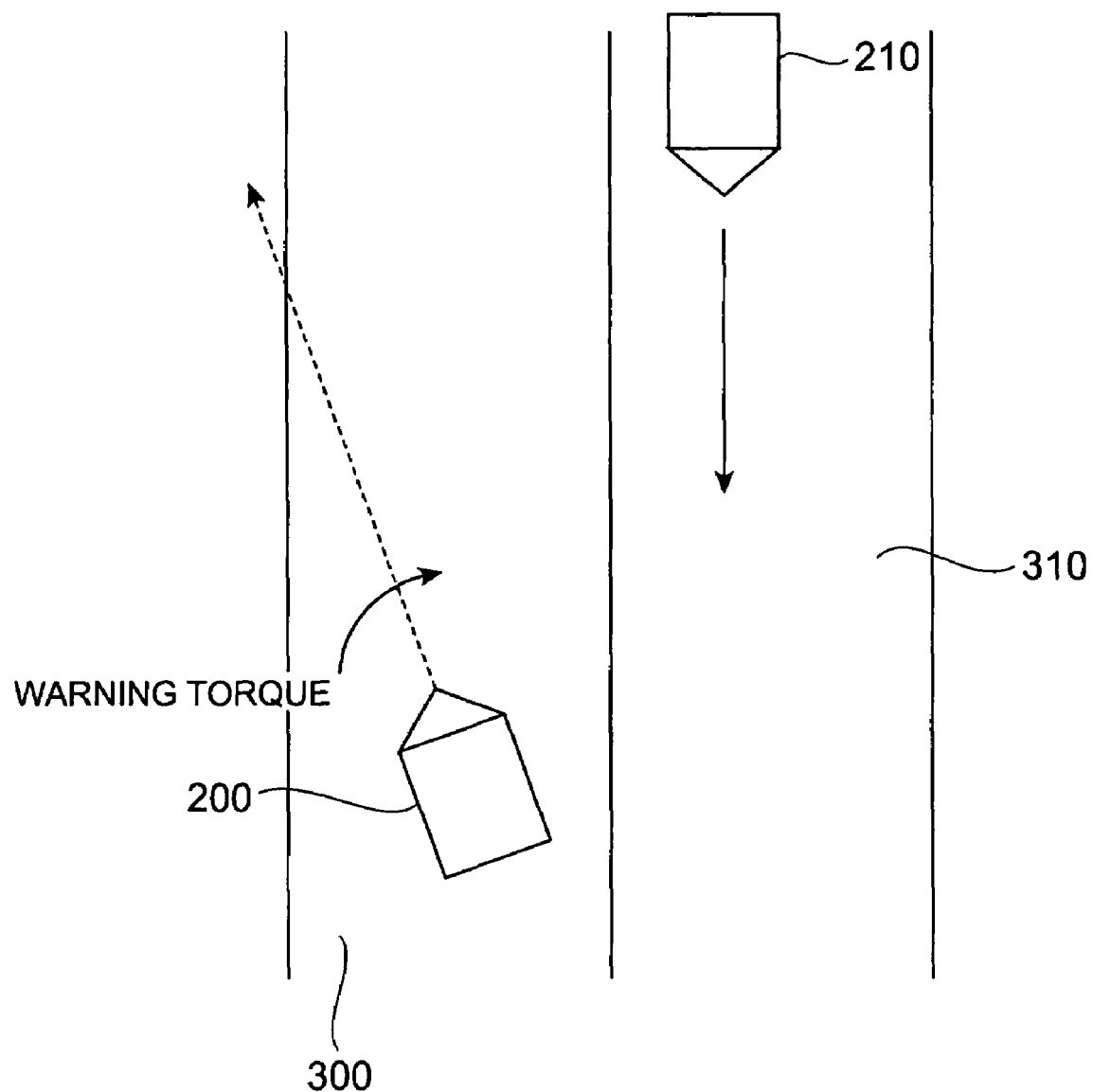
FIG. 13 is a drawing showing an example in which an obstacle exists in a direction (deviation avoidance direction) opposite to a lane deviation direction.

When it is determined that there is no obstacle in the deviation direction, it is further determined whether an obstacle exists in a direction opposite to the deviation direction, i.e., in a deviation avoidance direction (step S34). When an obstacle exists in the direction opposite to the deviation direction, for example, in a case where an opposing vehicle 210 is driving on a counter lane 310 as shown in FIG. 13, the flow transfers to step S35 to weaken the warning torque from the warning torque as the standard. When an obstacle exists in the deviation avoidance direction as shown in FIG. 13, the warning torque acts in the direction to approach the obstacle, and therefore the driver tends to feel the warning torque stronger than in the case without any obstacle, because of a sense of fear for approach to the obstacle. Therefore, the warning torque is weakened in comparison with that in the case without any obstacle, to alleviate the driver's uncomfortable feeling with the warning torque.

When it is determined in step S34 that no obstacle exists in either of the deviation direction and the opposite direction, the processing is directly terminated. In this case, the warning torque as the standard is applied.

Figure 14:
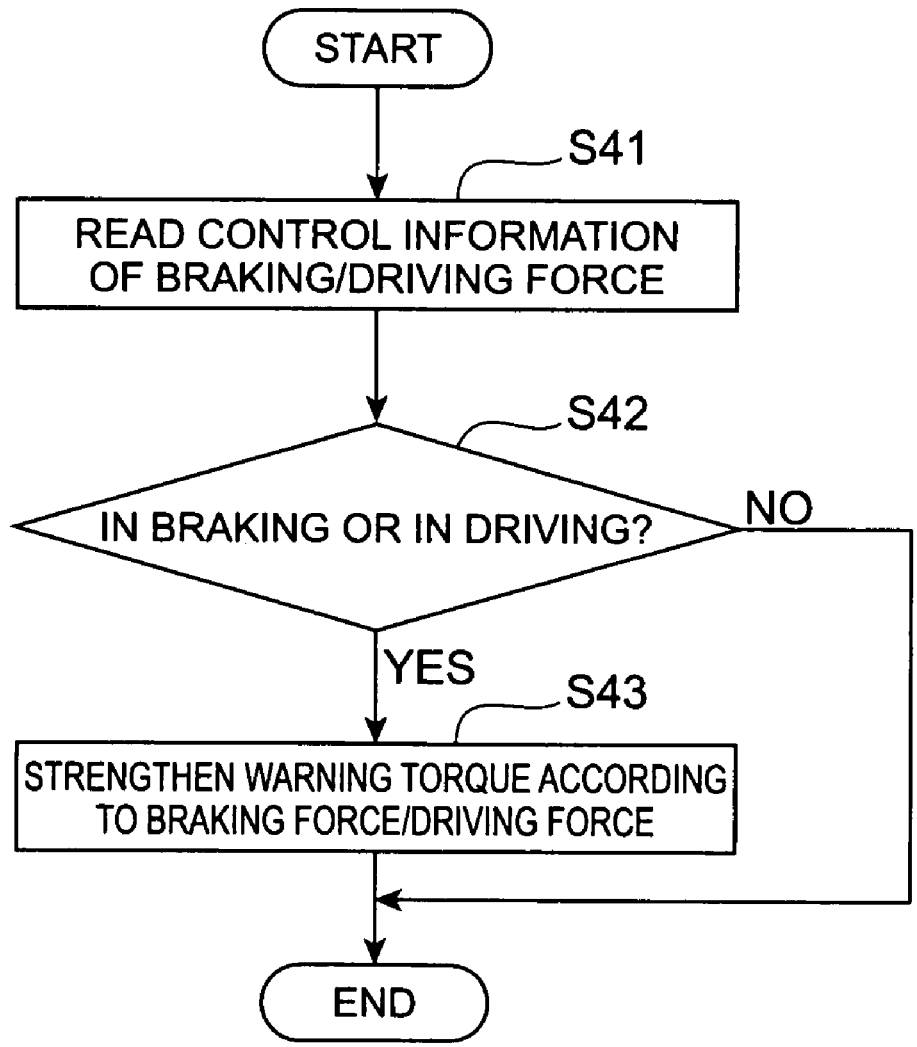
FIG. 14 is a flowchart showing a fifth embodiment of setting processing of the warning torque in the control apparatus of FIG. 1.

Next, the fifth control embodiment will be described. FIG. 14 is a flowchart showing the fifth embodiment of setting processing of the warning torque. It is also assumed herein that the warning torque as a standard is already set by the technique of the first embodiment or the second embodiment. It is assumed herein that the vehicle 200 is a vehicle in which a driving force is applied to the steered wheels (a front-wheel-drive vehicle or a four-wheel-drive vehicle).

The first step is to acquire control information of braking/driving force from the brake ECU 42 (step S41). The next step is to determine whether the vehicle is in braking or in driving (step S42). When the vehicle is neither in braking nor in driving, the processing is directly terminated. In this case, the warning torque as the standard is applied as it is. When the vehicle is in braking or in driving, the warning torque is strengthened according to a braking force/driving force (step S43).

When the braking force or the driving force is applied to the steered wheels, the self-aligning torque of the steered wheels is lowered to weaken the effect of the warning torque, decrease a sense of steering resistance, and also decrease the resulting real lateral acceleration. Therefore, the warning torque is increased so as to compensate for the reduction in the effect of the warning torque.

Specifically, an effective means can be selected from such techniques as (1) to increase the warning torque according to the accelerator stroke, (2) to increase the warning torque according to the brake pedal force, and (3) to increase the warning torque according to the hydraulic pressure of the wheel cylinder. Among these, (1) is to adjust the warning torque according to the driving force, and (2) and (3) are to adjust the warning torque according to the braking force.

The above described the embodiment to adjust the warning torque according to both of the braking force and the driving force, but the warning torque may also be adjusted according to either the braking force or the driving force. In the case where the vehicle is a rear-wheel-drive vehicle whose steered wheels are idle wheels, there is no need for control according to the driving force.

Furthermore, the control does not always have to be carried out based on the control information of braking/driving force. For example, the warning torque may also be adjusted based on a slope in a traveling direction of the vehicle (road surface slope). Normally, a driving force is given on a climbing road with a large road surface slope, and a braking force (including an engine brake) is given on a declining road with a large road surface slope. When the warning torque is adjusted according to the road surface slope, the same effect can be achieved as in the case where the provision of braking force/driving force is estimated from the road surface slope. This road surface slope can be determined from the acceleration in the anteroposterior direction of the vehicle, or the slope information may be acquired by a navigation system, road-vehicle communication, or the like.

Figure 15:
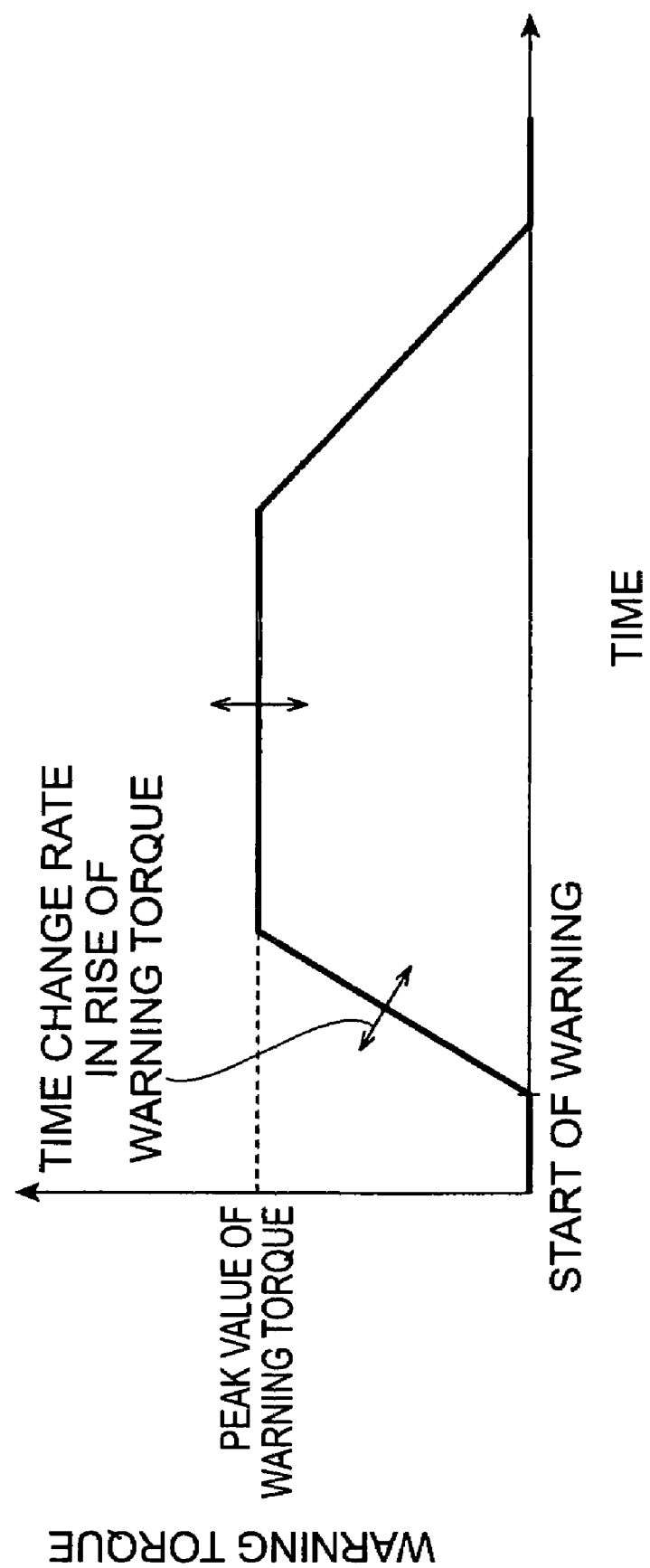
FIG. 15 is a drawing to explain a peak value and a slope in a rise of the warning torque.

In the above description, the adjustment of the warning torque may be carried out not only by changing the peak value of the warning torque, but also by changing the time change rate in a rise of the warning torque (cf. FIG. 15). In the weakening case of warning torque, it is also preferable to set a lower limit (greater than 0) for the peak value or for the time change rate. This lower limit is set at a level by which the driver can recognize application of the warning torque.

INDUSTRIAL APPLICABILITY

The present invention allows the warning torque to be set according to a vehicle speed, a road environment, an obstacle around the vehicle, or a braking force or a driving force generated on the steered wheels, whereby the warning torque of an appropriate strength can be applied according to a driving condition or an ambient condition. This prevents the driver from feeling uncomfortable with the applied warning torque, thus improves the drivability, and enables issue of an appropriate deviation warning.

The invention claimed is:
1. A vehicle deviation preventing apparatus comprising:
deviation determining means for detecting a driving lane on which a host vehicle is driving, and for determining whether the host vehicle will deviate from the driving lane, based on a positional relation between the driving lane and the host vehicle; and
warning means for applying to a steering wheel a torque for issuing a warning to a driver, with a determination of a deviation;
the vehicle deviation preventing apparatus having a vehicle speed detecting means for detecting a vehicle speed,
wherein the warning means sets the torque for issuing the warning to the driver, smaller when the detected vehicle speed is high than when the detected vehicle speed low, and wherein the torque applied by the warning means is set based on a yaw motion property of the vehicle.

2. The vehicle deviation preventing apparatus according to claim 1, wherein the warning means sets the torque for issuing the warning to the driver, smaller when the detected vehicle speed is larger than a predetermined vehicle speed, than the torque applied at the predetermined vehicle speed.

3. The vehicle deviation preventing apparatus according to claim 1, wherein the warning means decreases the torque for issuing the warning to the driver, with increase in the vehicle speed, when the vehicle speed is not less than the predetermined vehicle speed.

4. The vehicle deviation preventing apparatus according to claim 1, wherein the torque applied by the warning means is set smaller with increase in a time change rate of the torque.

5. A vehicle deviation preventing a apparatus comprising:
deviation determining means for detecting a driving lane on which a host vehicle is driving, and for determining whether the host vehicle will deviate from the driving lane, based on a positional relation between the driving lane and the host vehicle; and
warning means for applying to a steering wheel a torque for issuing a warning to a driver, with a determination of a deviation;
the vehicle deviation preventing apparatus having a driving environment grasping means for grasping a road driving environment,
wherein the warning means sets the torque for issuing the warning to the driver, based on the grasped road driving environment, and
wherein the road driving environment grasped by the driving environment grasping means is information about a lane width.

6. The vehicle deviation preventing apparatus according to claim 5, wherein the warning means sets the torque for issuing the warning to the driver, smaller when the lane width is narrow than when the lane width is wide.

7. A vehicle deviation preventing a apparatus comprising:
deviation determining means for detecting a driving lane on which a host vehicle is driving, and for determining whether the host vehicle will deviate from the driving lane, based on a positional relation between the driving lane and the host vehicle; and
warning means for applying to a steering wheel a torque for issuing a warning to a driver, with a determination of a deviation;
the vehicle deviation preventing apparatus having driving environment grasping means for grasping a road driving environment,
wherein the warning means sets the torque for issuing the warning to the driver, based on the grasped road driving environment, and
wherein the road driving environment grasped by the driving environment grasping means is inclination information of a road surface in a direction intersecting a driving direction.

8. The vehicle deviation preventing apparatus according to claim 7, wherein the warning means sets the torque for issuing the warning to the driver, smaller when a deviation direction is an upward direction of inclination of the road surface than when the deviation direction is a downward direction.

9. A vehicle deviation preventing apparatus comprising:
deviation determining means for detecting a driving lane on which a host vehicle is driving, and for determining whether the host vehicle will deviate from the driving lane, based on a positional relation between the driving lane and the host vehicle; and
warning means for applying to a steering wheel a torque for issuing a warning to a driver, with a determination of a deviation;
the vehicle deviation preventing apparatus having obstacle grasping means for grasping obstacle information around the vehicle,
wherein the warning means sets the torque for issuing the warning to the driver, based on the grasped obstacle information.

10. The vehicle deviation preventing apparatus according to claim 9, wherein the warning means sets the torque for issuing the warning to the driver, smaller when a deviation direction is a direction in which the vehicle moves away from the grasped obstacle than when the deviation direction is a direction in which the vehicle approaches the grasped obstacle.

11. A vehicle deviation preventing apparatus comprising:
deviation determining means for detecting a driving lane on which a host vehicle is driving, and for determining whether the host vehicle will deviate from the driving lane, based on a positional relation between the driving lane and the host vehicle; and
warning means for applying to a steering wheel a torque for issuing a warning to a driver, with a determination of a deviation;
wherein the warning means sets the torque for issuing the warning to the driver, according to a braking force or a driving force generated on a steered wheel.

12. The vehicle deviation preventing apparatus according to claim 11, wherein the steered wheel is a driving wheel and wherein the warning means sets the torque for issuing the warning to the driver, based on control information of a driving source.

13. The vehicle deviation preventing apparatus according to claim 11, wherein the warning means sets the torque for issuing the warning to the driver, based on control information of a braking system.

14. The vehicle deviation preventing apparatus according to claim 11, wherein a steered wheel is a driving wheel, the vehicle deviation preventing apparatus further comprising means for detecting a road slope, wherein the warning means sets the torque for issuing the warning to the driver, according to the detected road slope.

15. The vehicle deviation preventing apparatus according to claim 5, wherein the setting of the torque by the warning means is at least either setting of a peak value of the torque for issuing the warning to the driver or setting of a time change rate in a rise thereof.

16. The vehicle deviation preventing apparatus according to claim 15, wherein a minimum value is set for the peak value and the time change rate of the torque for issuing the warning to the driver, set by the warning means.

17. The vehicle deviation preventing apparatus according to claim 1, wherein the setting of the torque by the warning means is at least either setting of a peak value of the torque for issuing the warning to the driver or setting of a time change rate in a rise thereof.

18. The vehicle deviation preventing apparatus according to claim 7, wherein the setting of the torque by the warning means is at least either setting of a peak value of the torque for issuing the warning to the driver or setting of a time change rate in a rise thereof.

19. The vehicle deviation preventing apparatus according to claim 9, wherein the setting of the torque by the warning means is at least either setting of a peak value of the torque for issuing the warning to the driver or setting of a time change rate in a rise thereof.

20. The vehicle deviation preventing apparatus according to claim 11, wherein the setting of the torque by the warning means is at least either setting of a peak value of the torque for issuing the warning to the driver or setting of a time change rate in a rise thereof.

\* \* \* \* \*